Jan. 17, 1961 J. P. FAY 2,968,702
TRANSPORT MEANS FOR A MAGNET RECORDER-REPRODUCER
Filed Dec. 2, 1957 7 Sheets-Sheet 4

INVENTOR.
James P. Fay
BY
Johnson and Kline
ATTORNEYS

Jan. 17, 1961 J. P. FAY 2,968,702
TRANSPORT MEANS FOR A MAGNET RECORDER-REPRODUCER
Filed Dec. 2, 1957 7 Sheets-Sheet 5

INVENTOR.
James P. Fay
BY
Johnson and Kline
ATTORNEYS

Jan. 17, 1961 J. P. FAY 2,968,702
TRANSPORT MEANS FOR A MAGNET RECORDER-REPRODUCER
Filed Dec. 2, 1957 7 Sheets-Sheet 6

INVENTOR.
James P. Fay
BY
Johnson and Kline
ATTORNEYS

Jan. 17, 1961 J. P. FAY 2,968,702
TRANSPORT MEANS FOR A MAGNET RECORDER-REPRODUCER
Filed Dec. 2, 1957 7 Sheets-Sheet 7

INVENTOR.
James P. Fay
BY
Johnson and Kline
ATTORNEYS

United States Patent Office 2,968,702
Patented Jan. 17, 1961

2,968,702

TRANSPORT MEANS FOR A MAGNET RECORDER-REPRODUCER

James P. Fay, Norwalk, Conn., assignor to The Teletrak Corporation, Wilmington, Del., a corporation of Delaware Filed Dec. 2, 1957, Ser. No. 699,958

20 Claims. (Cl. 179—100.2)

The present invention relates to a device for recording and/or reproducing signals, particularly high frequency electrical signals, on a recording tape.

It is an object of the present invention to provide a device of the present type in which the tape is carried around a rotating drum or cylinder having at least one record-reproduce head therein in such a manner that a predetermined recording relationship exists between the tape and the recording head at all times, thus producing superior recording or reproduction from the tape.

In carrying out this object a novel cinch roller-feed roller combination is employed for feeding the tape longitudinally and around the drum in such a manner as to maintain the tape with a predetermined wrap-tension around the drum.

Another object of the invention is to provide a control for the feeding of the tape longitudinally with respect to the recording head to maintain a uniform tracking.

In accomplishing this, a unique system is employed whereby a variable speed drive is provided for the feed roller and the rotative position of the cylinder carrying the head establishes a signal which is recorded in a longitudinally extending control track and which is sensed by a monitor having a predetermined spaced relation to the recorded signal to regulate the speed of the feed roller when the signal is out of proper phase.

Another object of the invention is to provide a novel tape supply and take-up means which provides an adequate supply of tape and a responsive take-up for the tape to maintain the proper tape compliance at the recording and/or reproducing station.

In carrying out this object of the invention, the present invention provides means for feeding tape from a supply and providing a compliance loop between the supply and the recording station which is controlled by the tape itself so that there is always sufficient tape in the loop to provide the required tape at the speed at which it is being fed so that breakage of the tape is substantially eliminated. A similar means controlled by a compliance loop is provided to take up the tape as it is fed from said station.

A feature of the invention resides in the novel construction whereby the compliance loop is formed in an elongate compliance chute having a closed bottom to which is applied a light suction to draw the tape inwardly from the open end to form a loop, with the bight of the loop extending toward the bottom of the chute. The suction will maintain the strip with a slight tension and will tend to move it to the bottom of the chute as it is fed to the chute. The compliance chute is provided with means whereby the position of the bight of the loop controls the take-up or supply reel so as to maintain the bight in a predetermined position in the chute. This will, therefore, insure a proper supply or take-up of the tape as it feeds to and from the recording station.

Other features and advantages of the invention will be apparent from the specification and claims when considered in connection with the drawings in which:

As shown in the drawings, the device of the present invention comprises a frame 10 having a front panel 11 and a rear panel 12. Mounted on the frame to project from panel 11 is a cylinder or drum 13 having at least one record-reproducing head 14 mounted therein and disposed in the surface thereof. While this head may be of any suitable type in the illustrated form of the invention it is an electromagnetic head. As shown a second record-reproducing head 15 may be disposed in the opposite side of the drum and serves as a reproducing and/or a monitoring head as will be explained. The tape is provided on at least the surface 16a thereof facing the drum with record receiving material. Inasmuch as the recording means comprises a magnetic head, the material is a suitable magnetizable material.

Figure 1:
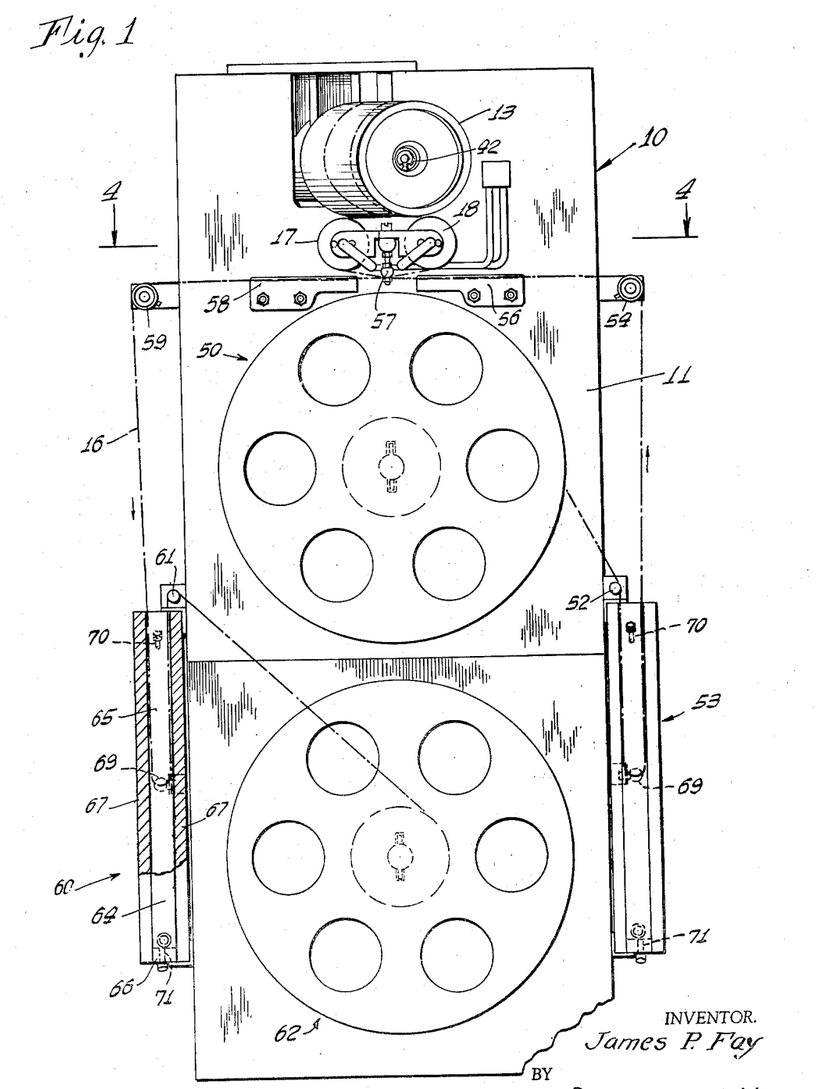
Figure 1 shows a front view, partly in section, of the device.
Figure 11:
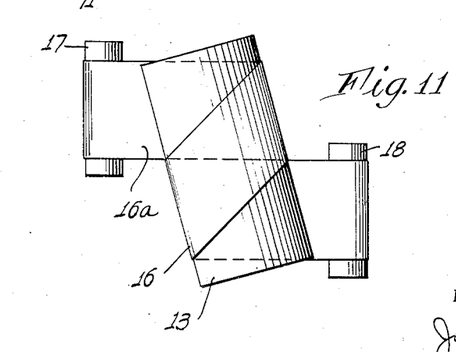
Fig. 11 is a schematic view showing the wrap of the tape around the record-reproduce drum or cylinder.

In the preferred form of the invention the drum 13 projects obliquely from the front panel and a flat tape 16 is wrapped therearound in a helix as it passes between a pair of rollers 17, 18 projecting perpendicularly from the panel as shown in Fig. 11 and in dot-and-dash lines in Fig. 1 for advancing the tape through the record-reproducing station 19.

As shown in the drawing roller 17 is the feed roller which engages the tape on one side of the drum and positively moves the tape to the drum. Roller 18 engages the tape on the other side of the drum to slip-feed the tape and serves as a cinch roller. The cinch roller is rotated in such a direction and at such a speed as to produce a predetermined wrap-tension around the cylinder so as to maintain the tape in a predetermined recording relation with the head carried by the cylinder. The feed roller and cinch roller are located in such a relation with respect to the cylinder that the tape is maintained in a helical wrap around the cylinder in the manner shown in Fig. 11 so that the tape overlies the path of movement of the head as it is rotated with the cylinder.

It will be understood that, with the tape fed about the drum with a predetermined wrap-tension and the drum rotating at a high speed with respect to the tape an air bearing or film will be formed and disposed between the drum and tape so as to permit the tape to float over the drum as it is fed longitudinally with respect thereto.

Figures 5, 6:
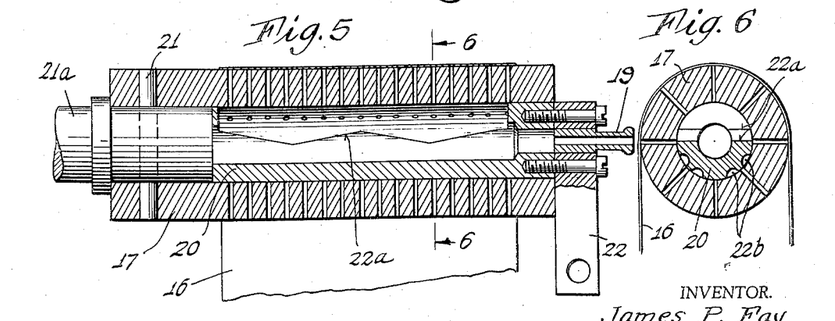
Fig. 5 is a sectional view through the tape advancing roller.
Fig. 6 is a sectional view taken along line 6—6 of Fig. 5.

While various types of positive feed means may be provided, it is presently preferred to form the feed roller 17 as a perforated roller having perforations therethrough throughout the whole roller and to provide a suction manifold 20 having a nipple 19 which is connected through a line 20A to a source of vacuum S so that the suction acting through the perforations will grip the tape to the surface of the roller as the roller is rotated and positively feed the tape. The feed roller as shown in Fig. 5 is pinned by pin 21 to one end of a feed roll shaft 21a. As is clear from Figs. 5 and 6, the manifold 20 is fixedly carried by a bracket 22 and is exposed only to that part of the feed roller which engages the tape. Preferably, the manifold is provided with a wavy or zig-zag surface 22a which permits the suction to be progressively applied to and released from the tape to progressively grip and release the tape as it feeds into and out of engagement with the roller. The other half of the manifold unit, as shown in Fig. 6, is not connected to the suction producing means and is provided with a plurality of vent passages 22b so that the tape is completely released from the suction grip as it leaves the roller and feeds to the drum. The vent passages will prevent any inadvertent gripping of the tape to the roller.

The cinch roller 18 is of similar construction to roller 17 and hence is not shown in detail. It has its suction manifold connected to line 20A through a line 20B and a pressure reducing means PR as shown in Fig. 2 to provide for slip feeding the strip as will be described.

In operation, the cylinder or drum 13 carrying the head 14 is driven at a predetermined speed and the tape is fed longitudinally at a speed much less than that of the drum so that the head traverses the tape a plurality of times and produces on the tape a series of parallel diagonal record tracks.

It is believed that the invention might be better understood if specific values are given throughout by way of example. For recording high frequency signals up to 4.4 megacycles, the drum, which is approximately 4.75" in diameter, is rotated by a synchronous motor 23 at 3600 r.p.m. and the tape 16, which is the usual flexible tape having its magnetic receiving surface facing the drum is about 4 inches wide and is fed longitudinally at 13.3 inches per second.

Figure 2:
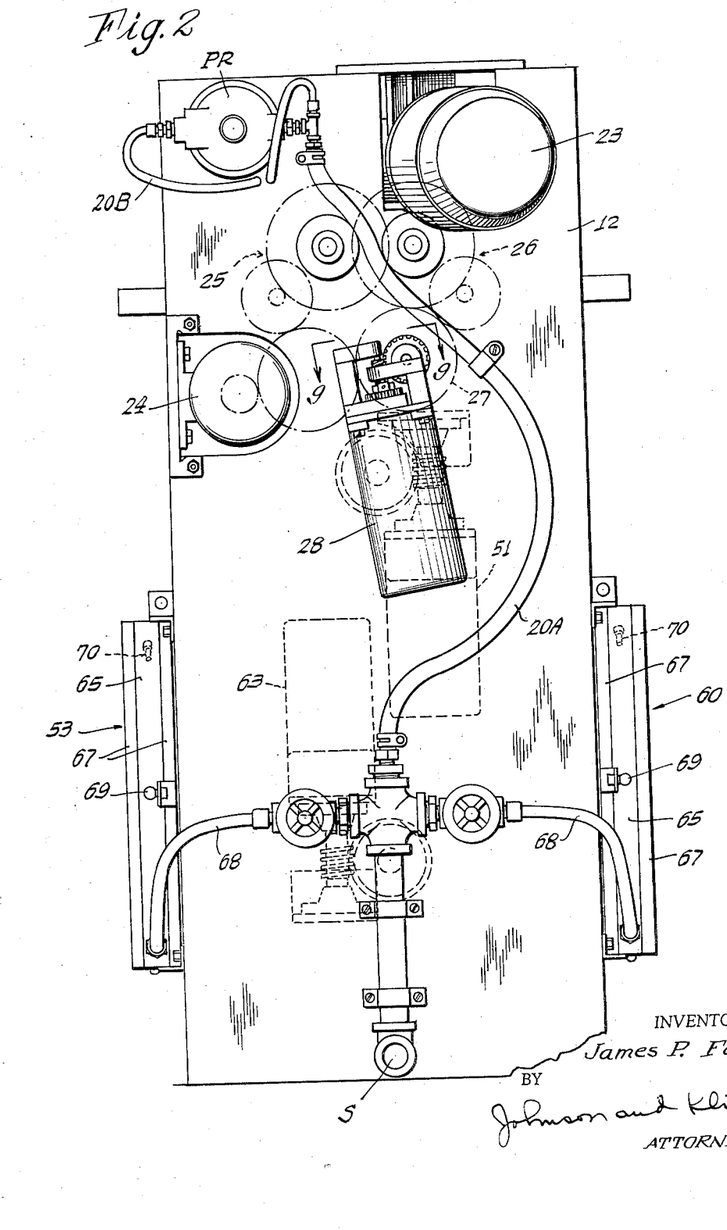
Fig. 2 is a rear view of the device.
Figure 3:
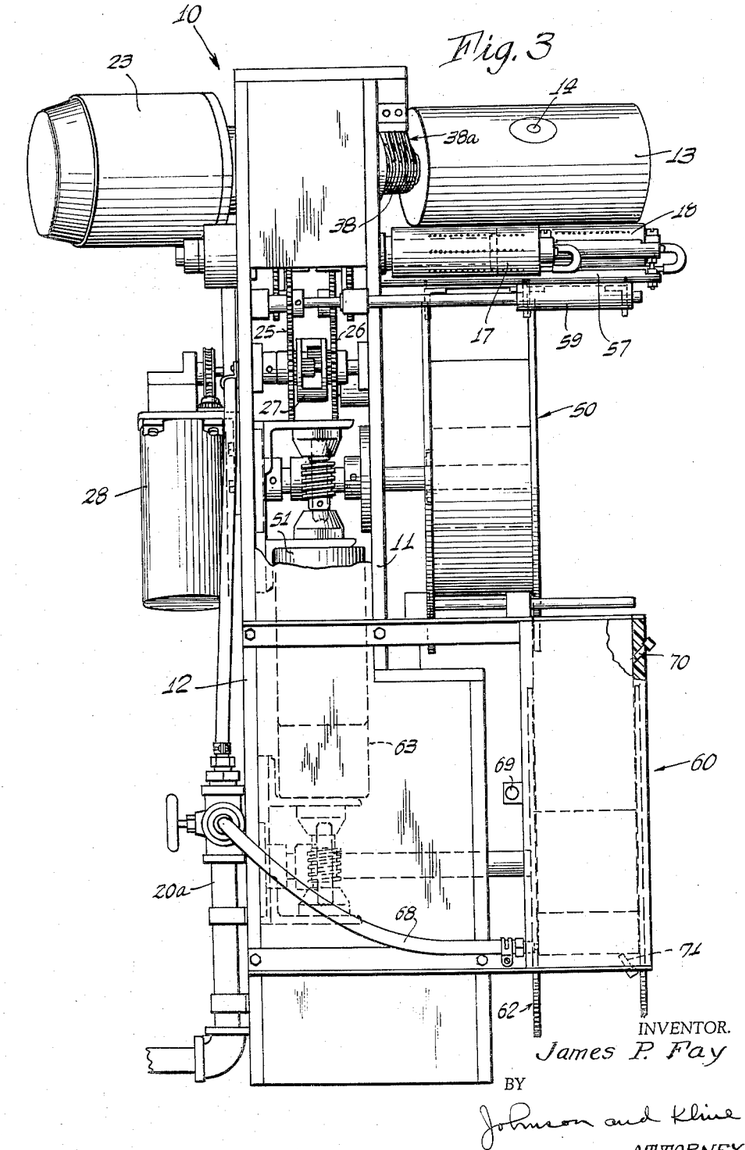
Fig. 3 is a side view, partly in section, of the device.
Figure 4:
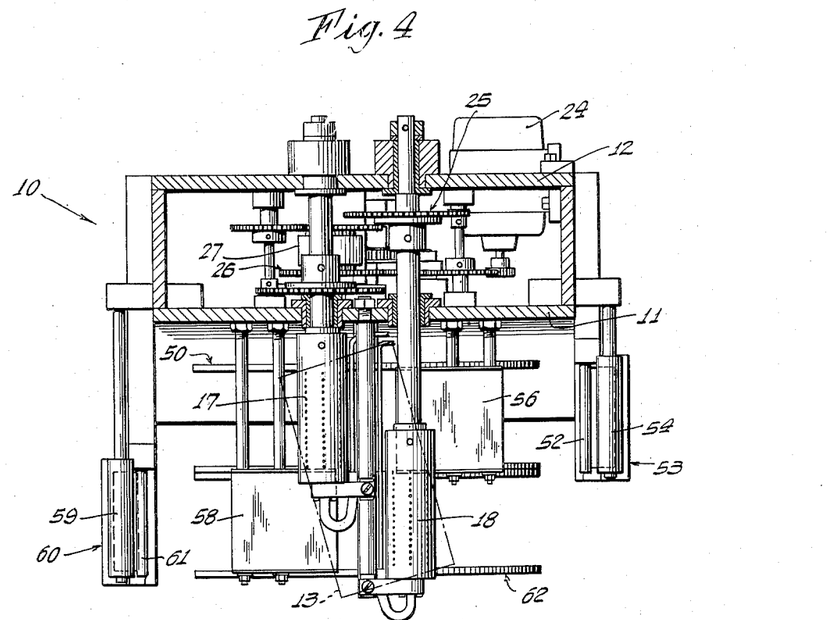
Fig. 4 is a transverse section taken along line 4—4 of Fig. 1.

While the feed roller 17 and cinch roller 18 may be driven independently by separately controlled motors, in the herein illustrated form of the invention the cinch roller 18 as shown in Figs. 2 to 4 is driven by a synchronous motor 24 through suitable reduction gearing 25. The feed roller 17 is driven from the same synchronous motor 24 through a reducing gear train 26 and a controlled differential gear 27 and at a speed less than that of the cinch roller. By way of example, both rollers are 2.015 inches in diameter and cinch roller 18 is rotated at 131.25 r.p.m. while feed roller 17 is rotated at 128.8 r.p.m. for normal operation. The speed of the feed roller can be varied by means of a two phase servo motor 28 controlling the differential 27 as will be explained. With a full suction of 5 inches of mercury applied to the feed roller 17 from the source through conduit 20A, the tape will be securely gripped by the feed roller 17 and positively fed thereby at a predetermined linear speed. The cinch roller is adapted to slip feed the tape in a manner to maintain a predetermined wrap-tension of the tape around the drum. While the roller can be driven by various slip drives, it is preferred to drive the roller at a constant speed and permit the slip to occur between the tape and roller, thus preventing inertia of the drive means from affecting the movement of the tape. This is accomplished by employing the relatively light suction on roller 18 so that the tape can slip over the surface thereof when there is excess driving torque applied to the tape by the roller. By varying the suction on the cinch roller, the driving torque value can be varied to provide a predetermined slip between the tape and roller so as to maintain a predetermined wrap-tension of the tape around the drum. By way of example, I have found a suction of between 1½ to 2 inches of mercury to be satisfactory.

It will be seen that if the wrap-tension around the drum tends to decrease so as to loosen the tape on the drum and produce a poor head-tape relation, the counter torque of the tape on the cinch roller would lessen so that there would be less slip of the tape and the roller 18 would act to take up slack and return the wrap-tension to normal. Similarly, if the wrap-tension should tend to increase to a point wherein the tape might break, than the counter torque of the tape would increase and cause the tape to slip more on the cinch roller and restore the predetermined wrap-tension in the tape and prevent breaking thereof.

On rewinding or reversing the movement of the tape for any purpose, I reverse motor 24, and control motor 28 so as to rotate the feed roll at 133.7 r.p.m. and the cinch roll at 131.25 r.p.m. so that the tape will slip-feed on the cinch roll and maintain a predetermined drag or tension in the tape as it is positively fed in the reverse direction by the feed roller.

Figures 7, 8, 9:
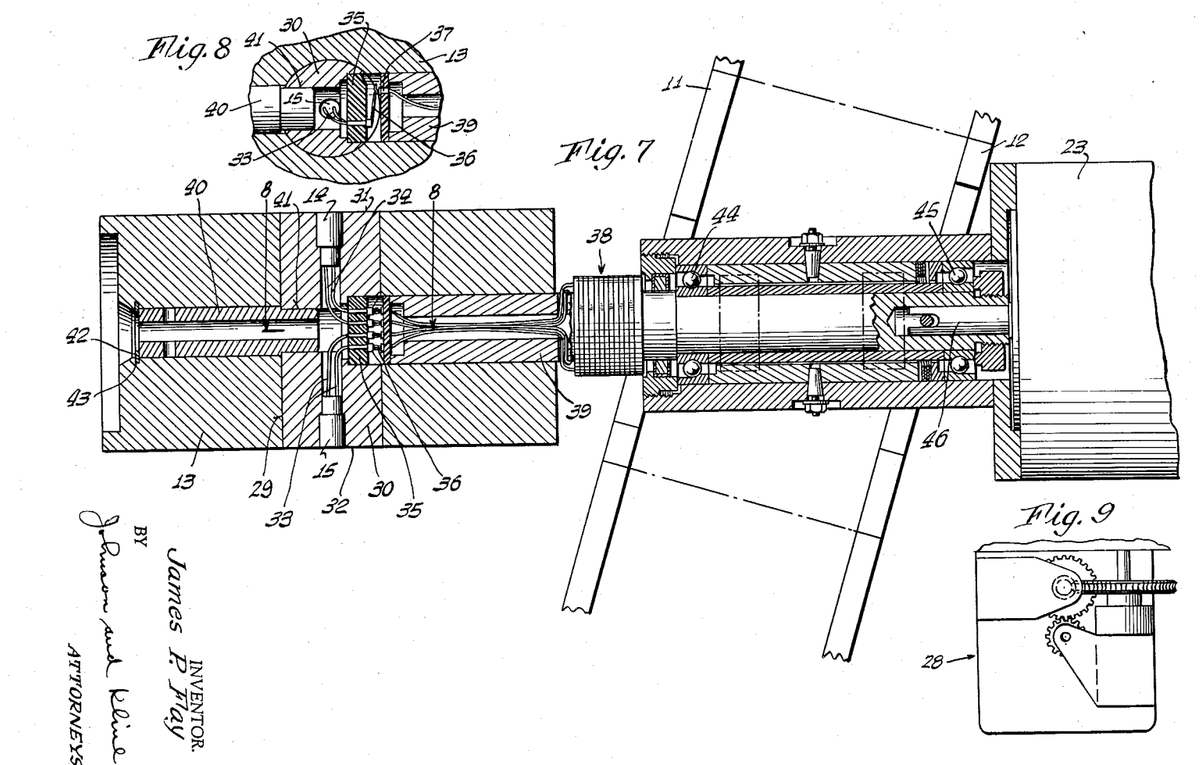
Fig. 7 is a view, partly in section, of the recording drum or cylinder and the mounting therefor.
Fig. 8 is a detail fragmentary sectional view taken along line 8—8 of Fig. 7.
Fig. 9 is a top view of the feed roller correcting motor taken along line 9—9 of Fig. 2.

While the record-reproducing heads may be mounted on the cylinder or drum in various ways, in the herein illustrated form of the invention as shown in Figs. 7 and 8, the drum or cylinder 13 is provided with a transverse bore 29 and a plug 30 is mounted therein having the heads 14, 15 mounted in the end faces 31, 32 of the plug forming a portion of the surface of the drum so as to be substantially flush therewith. The heads can be mounted on the plug and the leads 33, 34 therefrom connected to the contact block 35 before it is inserted in the cylinder which greatly facilitates the assembly and aligning of the heads. The plug is inserted in the bore and contacts 36 on the contact block 35 will automatically line up with and engage contacts 37 carried by the drum and connected to the slip rings 38 on the drum shaft 39 through which the signal is fed to and from the head by means of brushes 38a, Fig. 3, from a pick-up or reproducing means not shown. One of the heads can be the recording head and the other can be a reproducing and/or monitoring head as desired.

The plug 30 is held in position by an accurately positioned, axially extending shouldered pin 40 having the end fitting a transverse bore 41 in the plug, the pin being removably held in place by a snap ring 42 carried by a groove 43 on the drum and engaging the end of the pin. The shaft 39 carrying the drum is mounted on the frame 10 by suitable radial and thrust bearings 44, 45 as shown in Fig. 7 and is drivingly connected to the shaft 46 of the motor 23 to be driven at a constant speed.

Figure 10:
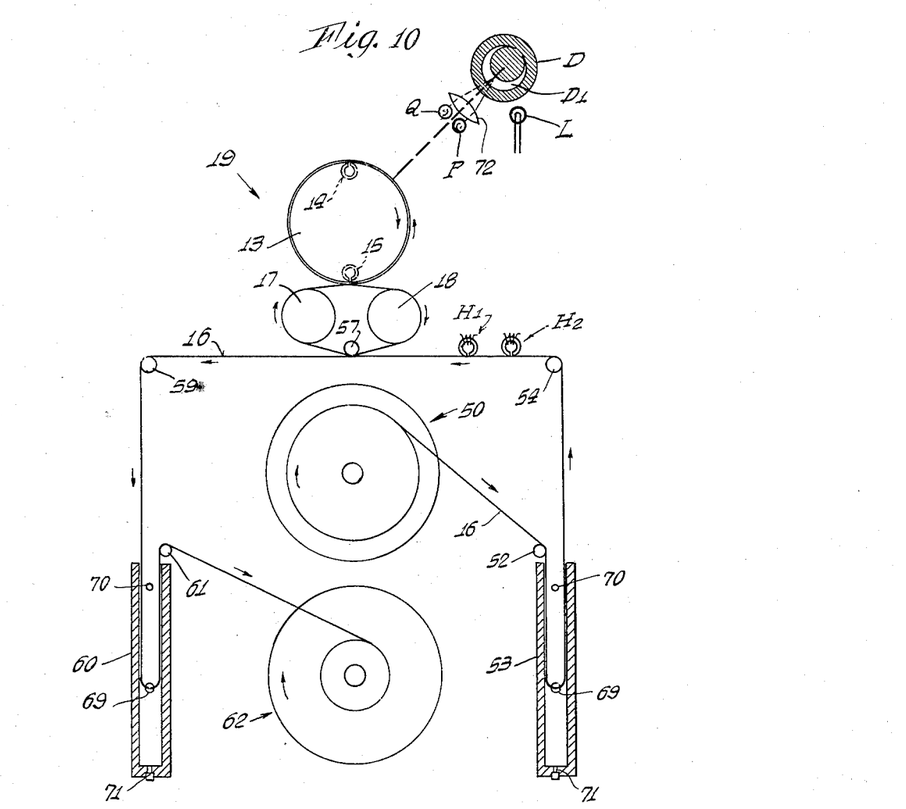
Fig. 10 is a diagrammatic view showing the direction of rotation of the feed roller, cinch roller and recording drum with the directional movement of the tape indicated for the illustrated form of the invention.

In order to supply and receive the tape passing to and from the recording station, a novel tape handling system as illustrated in Figs. 1, 2, and 10 is provided which includes a supply from which the tape is fed, preferably in the form of a reel 50 upon which is stored a supply of tape 16 and driven by a suitable reversible motor herein illustrated as a two-phase servo motor 51. The tape feeds from the reel over a guide 52 and into a supply compliance chute 53, to form a loop therein. The tape leaves the chute, passes over a guide roller 54 and, if desired, a guide plate 56 and guide rod 57, to the feed roller 17 around the drum 13 and to the cinch roller 18. Upon leaving the cinch roller the tape passes under the guide rod 57, over a guide plate 58 to a guide roller 59 and thence to a take-up compliance chute 60 to form a loop therein. Leaving the chute 60, the tape passes over the guide roller 61 to the take-up means herein illustrated as a take-up reel 62 driven by a two-phase servo motor 63.

By the provision of the compliance loop in both the supply and the take-up means, there will be assured a definite amount of "free" tape between the supply reel and take-up reel to insure smooth handling of the tape at the recording station.

As shown in Figs. 1 and 3, the compliance loops are disposed in their respective compliance chutes. Since both of the chutes are of the same construction, only one will be described in detail. It comprises front 64, back 65 and bottom 66 walls, which walls have a width slightly greater than the width of the tape. The sides 67 of the chute are closed by walls so that the chute is airtight. Suction from the source S is supplied through line 68 connected to the bottom of the chute and acting on the loop of tape extending into the top of the chute tends to yieldingly pull the tape down into the chute as shown. The amount of suction is merely that which is necessary to maintain the loop. For example a suction of 2 inches of mercury has been found satisfactory for this purpose.

The front, back and bottom walls are preferably made of metal and are grounded so as to remove any static electricity which may be generated by the moving tape and which might interfere with free movement of the tape as it feeds to and from the recording station.

Figure 13:
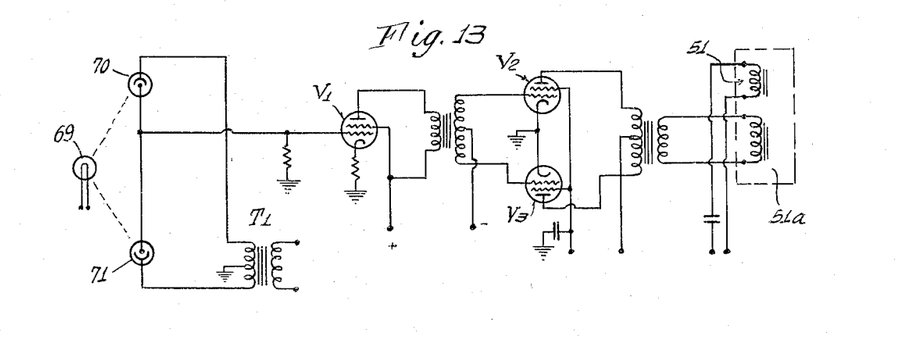
Fig. 13 shows the circuit diagram for controlling the feed and/or take-up means for the tape by the bight in the compliance loop.

In order to maintain a predetermined loop on the chute, a novel control means as shown in Figs. 1 and 13 is provided for regulating the drive of the supply and take-up reels. This is accomplished by positioning a light source 69 in one side of the chute substantially midway the ends of the chute. A pair of light sensitive cells 70, 71 are located on the opposite side adjacent the top and bottom of the chute. The light is directed so that when the bight of the loop is in mid position, such as shown in Fig. 1, the two light cells are energized in the same amount. These cells as shown in the circuit of Fig. 13 are connected across the transformer $T_1$ in such a manner that when so equally energized, they normally balance the circuit. Should the loop become short, the bight of the tape will move upwardly above the light source 69 and block out light from the upper cell 70. This will unbalance the circuit and will supply, through tubes $V_1$, $V_2$, and $V_3$, the control field 51a of the servo motor 51, for the reel with an excitation sufficient in amount and in the proper direction to cause the reel to be driven in a direction to feed more tape to the chute. As the tape is fed to the chute, suction in the bottom of the chute will cause the tape to be immediately drawn into the chute and cause the bight to move down until it reaches the midpoint, at which time the circuit becomes balanced again. On the other hand, should the bight extend below the midportion, the cell 71 will be shaded causing the circuit of Fig. 13 to apply the excitation to the control field 51a to actuate the motor to rewind on the supply reel an amount of tape sufficient to maintain the loop at the neutral position. With this control on the supply of tape, it will be seen that there is always in the chute a "free" loop of tape sufficient to supply the recording station with the required amount of tape to maintain the tape fed at the desired speed.

The compliance loop in the tape feeding from the recording station to the take up cooperates in a similar manner with the take-up compliance chute 60 having the light source and photo cells and the control circuit connected thereto to control the circuit to the control field of the motor 63 driving the take-up reel to rotate the reel in such a direction as to maintain the loop in the chute at a substantially balanced position. This will insure that the take-up means will not tend to take up the tape at a greater rate than it is fed from the recording station so as to interfere with proper movement of the tape at the station.

Figure 12:
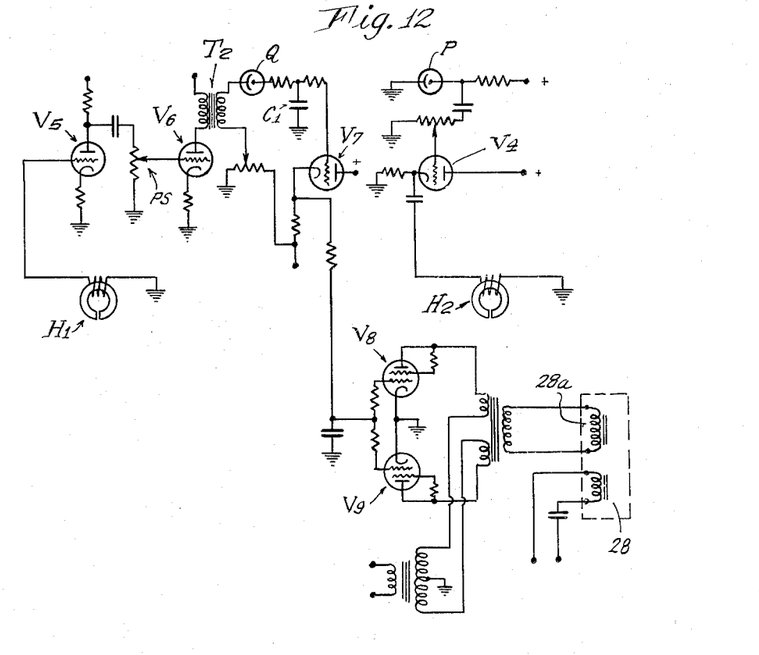
Fig. 12 shows the circuit diagram for the feed roller monitoring system.

In order to control and/or correlate the speed or velocity of the tape and rotative relation of the drum and the heads thereon so as to (1) provide accurately located recording paths on the tape, and (2) to align the reproducing heads with the recorded lines on playback, the present invention provides a control means which is shown diagrammatically in Fig. 10 and the circuit of which is shown in Fig. 12.

Considering the first situation, a control signal is laid down or recorded in a longitudinal track on the edge of the tape in accordance with the rotational position of the head or the drum. While this may be accomplished in many ways, in accordance with the present invention the shaft connected to the drum 13 is provided with a disk D having a crescent-shaped reflecting area D1 thereon, which disk is fixed on the shaft in a predetermined rotative position with respect to the drum and the heads carried thereby as illustrated in Fig. 10. The disk is illuminated by light source L and the light is reflected on the light sensitive cells P and Q. While the cells P and Q can be arranged so that the cells have a predetermined phase relation by the physical positioning or spacing of the cells, it is at present preferred to expose the cells to the same reflective beam by means of a lens means 72. This generates in the cell P a sinusoidal wave of 60 cycles per second which is impressed on an amplifier tube $V_4$ (Fig. 12) connected to a recording head H2 located so as to overlie the path of movement of the tape from the supply to the recording station and produce a longitudinal control track on the tape.

It is known that when a wave of predetermined frequency is recorded on a tape and the distance measured between the wave crests that the velocity of the propagation of the wave can be determined. Therefore, a monitoring head H1 is located a predetermined distance from H2, and in a position to monitor the track recorded by the head H2. For example, with the correct tape velocity of 13⅓ inches per second and with the control frequency of 60 cycles per second, the distance representing the half wave is determined to be .011 inch. If the heads are separated by this amount, then the output of H1 will be 180° out of phase with H2. The circuit shown in Fig. 12 will be used to maintain the desired phase relation between the heads and it is more convenient to use 90° as a displacement for the circuit and it is well known that 450° and 810° are equivalent points on the wave and may be used since they are multiple wave lengths. The larger number of wave lengths, of course, will produce a larger phase change for a given speed change, thus increasing the selectivity of the system.

With the head H1 so located, it will pick up the recorded signal at a predetermined distance from the recording head H2. The picked up signal will be applied through tubes $V_5$ and $V_6$ to transformer T2 and to cell Q. If desired a phase shifter PS may be employed between tubes $V_5$ and $V_6$ to provide for track adjustment for initial set up or for machine interchangeability. The cell Q is modulated by the same light source L and modulates or gates the voltage from T2. The combined output applied to C1 will be zero volts if the overall circuit phase difference be 90° or a whole number of wave lengths greater than 90°. Any other relationship than this will cause a voltage of a polarity and magnitude sufficient to restore the 90° condition. The voltage across C1 is applied through tubes $V_7$, $V_8$, $V_9$ to the control winding 28a of the two phase speed correcting control motor 28 for the feed roll 17 for adding to or correcting the velocity of the tape.

In the second situation, on playback since the control track is already recorded on the tape in predetermined relation to the recorded signal, the circuit for head H2 is rendered inoperative. The circuit including monitor head H1 and cell Q will monitor the recorded control track and function in the manner set forth above to adjust the speed of the feed roller in order to control the velocity of the tape to maintain a proper tracking of the pick-up head 15 on the recorded signals.

Variations and modifications may be made within the scope of the claims and portions of the improvements may be used without others.

I claim:

1. An apparatus for recording and/or reproducing signals on a record tape comprising a drum having at least one record-reproducing head disposed therein, means for rotating the drum at a constant speed, feed means on one side of the said drum for feeding a tape relative to said drum at a speed less than the peripheral speed of the drum with the tape disposed in a helix around the drum and overlying the path of movement of the head, and a driven cinch roll means engaging the tape on the other side of the drum, said drum being rotated in a predetermined direction in which the traction of the drum on the tape wrapped therearound tends to move the tape away from the cinch roll means, said cinch roll means being driven at a surface speed different than the feed means to cause the tape to be moved at a rate tending to increase the wrap-tension around the drum and including means for slip feeding the tape to control and maintain the tape at a predetermined wrap-tension around the drum.

2. Apparatus for recording and/or reproducing signals on a record tape comprising a drum having at least one record-reproducing head disposed in the surface thereof, means for rotating the drum at a constant speed, and means for feeding a tape longitudinally to, around and away from said drum with the tape disposed in a helix around the drum and overlying the path of movement of the head, said means comprising a driven feed roller engaging the tape and located on one side of the drum to feed the tape at a speed substantially less than the peripheral speed of the drum and a driven cinch roller means engaging the tape on the other side of the drum and cooperating therewith to yieldably feed the tape at a different surface speed and direction to maintain the tape at a predetermined wrap-tension around the drum.

3. In a device for recording and/or reproducing electrical signals, a drum having a record-reproducing head exposed in the surface thereof, means for rotating said drum at a predetermined speed to move the head in a predetermined path, means for guiding a record tape to form a loop of substantially 360° around said drum and overlying the path of movement of said head with the axis of the tape oblique to the axis of the drum, feed roller means engaging the tape on one side of the drum for longitudinally feeding the tape at a speed substantially less than the peripheral speed of the drum whereby the head moves diagonally across the tape, said tape having a record-receiving surface facing said drum, a cinch roller engaging the tape on the opposite side of the drum to slip-feed said tape, and means driving said cinch roller at a surface speed different than that of said feed roller whereby a predetermined wrap-tension of the tape around the drum is maintained.

4. Apparatus for recording and/or reproducing signals on magnetic tape comprising a drum having at least one magnetic reproducing head disposed therein for rotation therewith, means for rotating the drum at a constant speed, means for feeding a tape to, around and away from said drum with the tape disposed in a helix around the drum and overlying the path of movement of the head, said means comprising positive feeding means for the tape located on one side of the drum to positively feed the tape at a speed substantially less than the peripheral speed of the drum, and cinch roller means driven at a different surface speed than the feed means and engaging the tape on the other side of the drum and cooperating therewith to slip-feed the tape at a speed and in the direction to maintain the tape at a predetermined wrap-tension around the drum.

5. Apparatus for recording and/or reproducing signals on a record tape comprising a drum having at least one record-reproducing head disposed in the surface thereof, means for rapidly rotating the drum at a constant speed, means for feeding a tape to, around and away from said drum with the tape disposed in a helix around the drum and overlying the path of movement of the head, said means comprising a variable speed feed roller engaging the tape and located on one side of the drum to feed the tape at a speed substantially less than the peripheral speed of the drum and cinch roller means driven at a predetermined different surface speed with respect to the feed roller and engaging the tape on the other side of the drum and cooperating therewith to slip-feed the tape at a speed and in the direction to maintain the tape at a predetermined wrap-tension around the drum, and means controlling the speed of the feed roller to maintain a predetermined speed relation between the speed of the tape and the speed of the drum.

6. Apparatus for recording and/or reproducing signals on a record tape comprising a drum having at least one record-reproducing head disposed in the surface thereof, means for rotating the drum at a constant speed, means for feeding a tape to, around and away from said drum with the tape disposed in a helix around the drum and overlying the path of movement of the head, said means comprising a variable speed feed roller engaging the tape and located on one side of the drum to feed the tape at a speed substantially less than the peripheral speed of the drum and cinch roller means engaging the tape on the other side of the drum, said cinch roller means including means cooperating to slip-feed the tape at a speed and in the direction to maintain the tape at a predetermined wrap-tension around the drum, and means operated in accordance with the rotation of the drum and controlling the speed of the feed roller to maintain a predetermined speed relation between the speed of the tape and the speed of the drum.

7. Apparatus for recording and/or reproducing signals on a record tape comprising a drum having at least one record-reproducing head disposed thereon, means for rotating the drum at a constant speed, means including a variable speed feed roller for positively feeding a tape to, around and away from said drum with the tape disposed in a helix around the drum and overlying the path of movement of the head, and means controlling the speed of the feed roller to maintain a predetermined speed relation between the speed of the tape and the speed of the drum and comprising means generating a control signal of a predetermined frequency and wave form in predetermined relation to the rotative position of the drum, means spaced from said drum for recording said control signal in a longitudinal track on the tape, and pick-up means spaced a distance along the tape to overlie said longitudinal track and having a relation to the wave length of said control signal to pick up said recorded control signal and to control the speed of the feed roller in accordance with the phase relation of said picked-up signal.

8. Apparatus for recording and/or reproducing signals on a record tape comprising a drum having at least one record-reproducing head disposed in the surface thereof, means for rotating the drum at a constant speed, and means for feeding a tape to, around and away from said drum with the tape disposed in a helix around the drum and overlying the path of movement of the head, said means comprising a driven perforated feed roller having a predetermined suction thereon engaging the tape at one side of the drum to positively feed the tape at a speed substantially less than the peripheral speed of the drum and a driven perforated cinch roller rotated at a higher speed than the feed roller and having a suction less than that of the feed roller and engaging the tape on the other side of the drum and cooperating therewith to slip-feed the tape at a speed and in the direction to maintain the tape at a predetermined wrap-tension around the drum.

9. Apparatus for recording and/or reproducing signals on a record tape comprising a drum having at least one record-reproducing head disposed in the surface thereof, means for rotating the drum at a constant speed, means for feeding a tape to, around and away from said drum with the tape disposed in a helix around the drum and overlying the path of movement of the head, said means comprising a variable speed feed roller engaging the tape and located on one side of the drum to feed the tape at a speed substantially less than the peripheral speed of the drum and cinch roller means engaging the tape on the other side of the drum and cooperating therewith to slip-feed the tape at a speed and in the direction to maintain the tape at a predetermined wrap-tension around the drum, and means controlling the speed of the feed roller to maintain a predetermined speed relation between the speed of the tape and the speed of the drum, comprising means generating a control signal in predetermined relation to the rotative position of the drum, means spaced from said drum and recording said control signal on the tape, and pick-up means spaced a predetermined distance along the tape to pick up said recorded control signal and to control the speed of the feed roller in accordance with the phase relation of said picked-up signal.

10. Apparatus for recording and/or reproducing signals on a record tape comprising a drum having at least one record-reproducing head disposed in the surface thereof, means for rotating the drum at a constant speed, means for feeding a tape to, around and away from said drum with the tape disposed in a helix around the drum and overlying the path of movement of the head, said means comprising a driven perforated feed roller having a predetermined suction thereon engaging the tape at one side of the drum to positively feed the tape at a speed substantially less than the peripheral speed of the drum and a driven perforated cinch roller rotated at a higher speed than the feed roller and having a suction less than the feed roller and engaging the tape on the other side of the drum and cooperating therewith to slip-feed the tape at a speed and in the direction to maintain the tape at a predetermined wrap-tension around the drum, and means for supplying tape to said feed roller comprising a reel, means for rotating said reel, a chute between the reel and feed roller for receiving a loop of tape and having a suction in the bottom thereof less than that on said feed roller for urging the bight of the loop toward said bottom and without affecting the positive feeding of the tape, and light-responsive means carried by the chute controlled by the position of the bight of the loop for actuating the means for rotating said reel to maintain the loop of predetermined size.

11. Apparatus for recording and/or reproducing signals on a record tape comprising a record-reproducing head rotatable in a circular path about a fixed axis, means for rotating the head at a constant speed, means for feeding a tape from a supply, supporting means supporting the tape in recording position with the tape disposed in a helix around and overlying the path of movement of the head, and a driven cinch roller engaging the tape on the other side of said supporting means, said cinch roller being driven at a surface speed different than the feeding means and having means slip-feeding the tape to maintain the tape at a predetermined wrap-tension around the supporting means.

12. Apparatus for recording and/or reproducing signals on a record tape comprising a drum having at least one record-reproducing head disposed in the surface thereof, means for rotating the drum at a constant speed, and means for feeding a tape longitudinally to, around and away from said drum at a speed substantially less than the peripheral speed of the drum with the tape disposed in a helix around the drum and overlying the path of movement of the head, said means comprising a driven feed roller engaging the tape and located in fixed position on one side of the drum to feed the tape, and yieldable feeding means in fixed position on the other side of the drum and cooperating with the tape to yieldably feed the tape at a speed different than the feed roller and in a direction to maintain the tape at a predetermined wrap-tension around the drum.

13. Apparatus for recording and/or reproducing signals on a record tape comprising a drum having at least one record-reproducing head disposed in the surface thereof, means for rotating the drum at a predetermined speed, and means for feeding a tape longitudinally to, around and away from said drum at a speed substantially less than the peripheral speed of the drum with the tape disposed in a helix around the drum and overlying the path of movement of the head with the rotative movement of the drum with respect to the tape disposed therearound forming an air film therebetween, said means comprising a driven feed roller engaging the tape and located in fixed position on one side of the drum to feed the tape, and yieldable feeding means in fixed position on the other side of the drum and cooperating with the tape to yieldably feed the tape at a speed different than the feed roller and in a direction to maintain the tape at a predetermined wrap-tension around the drum and the air film at a predetermined thickness as controlled by the wrap-tension whereby a good head-tape relation is maintained.

14. Apparatus for recording and/or reproducing signals on a record tape comprising a drum having at least one record-reproducing head disposed in the surface thereof, means for rotating the drum at a predetermined speed, and means for feeding a tape longitudinally to, around and away from said drum at a speed substantially less than the peripheral speed of the drum with the tape disposed in a helix around the drum and overlying the path of movement of the head with a predetermined wrap-tension and a predetermined air film between the drum and tape, said means comprising a driven feed roller engaging the tape and located in fixed position on one side of the drum to feed the tape, a driven perforated cinch roller in fixed position on the other side of the drum and cooperating with the tape, and means for applying a predetermined suction on the cinch roller to cause said roller to yieldably feed the tape at a speed and direction to maintain the air film and wrap-tension at said predetermined values whereby a good head-tape relation is maintained.

15. In an apparatus having head means cooperating with tape movable longitudinally relative thereto for recording and/or reproducing signals thereon, means for controlling the speed of the tape to maintain a predetermined relation between the head position and the recorded signal comprising means for generating a control signal of a predetermined frequency and wave form, means recording the generated signal in a longitudinal track on the tape in predetermined relation to the position of the head, pick-up means overlying the recorded longitudinal track, said pick-up means being spaced along the tape from the means for recording the longitudinal track a distance having a relation to the wave length of the generated signal, means feeding the picked-up signal and generated signal to a phase comparator circuit, and means responsive to a phase shift between said signals for varying the movement of the tape to restore the predetermined relation between the recorded signal and head position.

16. In an apparatus for producing recorded transversely extending signals on a longitudinally moving tape by means of a rotatably mounted recording head movable thereover, means for controlling the feeding of the tape to maintain a predetermined speed relation between the speed of the tape and the rotation of the head to properly locate the recorded signals on the tape comprising means for generating a control signal of a predetermined frequency and wave form in predetermined relation to the rotative position of the recording head, means recording the generated signal in a longitudinal track on the tape, pick-up means overlying the recorded longitudinal track, said pick-up means being spaced along the tape from means for recording the longitudinal track a distance having a relation to the wave length of the generated signal, means feeding the picked-up signal and generated control signal to a phase comparator circuit, and means responsive to a phase shift between said picked-up and generated signals for varying the rate of travel of the tape to restore the predetermined relation between the tape and head speeds.

17. In an apparatus for reproducing recorded signals on a longitudinally moving tape by means of a rotatably mounted reproducing head movable thereover, means for controlling the feeding of the tape to maintain a predetermined relation between the recorded signal on the tape and the position of the head comprising a longitudinally recorded track on the tape having a control signal of a predetermined frequency and wave form and located in predetermined relation to the recorded signals, means generating a signal having said frequency and wave form in predetermined relation to the rotative position of the reproducing head, pick-up means overlying the recorded longitudinal track, said pick-up means being spaced along the tape ahead of the reproducing head a distance having a relation to the wave length of the generated signal, means feeding the picked-up signal and generated signal to a phase comparator circuit, and means responsive to a phase shift between said signals for varying the movement of the tape with respect to the reproducing head to maintain the predetermined spaced relation between the head and pick-up means whereby said head is maintained in reproducing relation with said recorded signals.

18. The invention as defined in claim 2 wherein said drum has a transverse bore therein and wherein said head is mounted in an end of a plug removably mounted in said bore and held therein by a key extending axially of the drum and engaging a transverse bore in said plug.

19. The invention as defined in claim 2 wherein said drum has a transverse bore therein, said head is mounted in an end of a plug removably mounted in said bore and held therein by a key extending axially of the drum and engaging a transverse bore in said plug and wherein said plug has contacts thereon connected to said head and contacting contacts carried by the drum when the plug is in position in the bore in the drum.

20. Apparatus for recording and/or reproducing signals on a record tape comprising a drum having at least one record-reproducing head disposed in the surface thereof, means for rotating the drum at a constant speed, means for feeding a tape to, around and away from said drum with the tape disposed in a helix around the drum and overlying the path of movement of the head, said means comprising a driven perforated feed roller having a predetermined suction thereon engaging the tape at one side of the drum to positively feed the tape at a speed substantially less than the peripheral speed of the drum and a driven perforated cinch roller rotated at a higher speed than the feed roller and having a suction less than the feed roller and engaging the tape on the other side of the drum and cooperating therewith to slip-feed the tape at a speed and in the direction to maintain the tape at a predetermined wrap-tension around the drum, and means for taking-up the tape from the cinch roller comprising a reel, means for rotating said reel, a chute between the reel and cinch roller for receiving a loop of tape and having a suction in the bottom thereof less than that on said cinch roller for urging the bight of the loop toward said bottom and without affecting the slip feeding of the tape, and light-responsive means carried by the chute controlled by the position of the bight of the loop for actuating the means for rotating said reel to maintain the loop of predetermined size.

References Cited in the file of this patent

UNITED STATES PATENTS

| | | |
|---|---|---|
| 1,707,243 | Wildhaber | Apr. 2, 1929 |
| 2,314,834 | Kiel | Mar. 23, 1943 |
| 2,747,025 | Selsted | May 22, 1956 |
| 2,773,120 | Masterson | Dec. 4, 1956 |
| 2,778,634 | Gams et al. | Jan. 22, 1957 |
| 2,818,322 | Blakely | Dec. 31, 1957 |
| 2,862,067 | Christoff | Nov. 25, 1958 |
| 2,866,012 | Ginsburg et al. | Dec. 23, 1958 |
| 2,919,314 | Holt | Dec. 29, 1959 |

FOREIGN PATENTS

| | | |
|---|---|---|
| 159,639 | Sweden | July 16, 1957 |
| 927,999 | Germany | May 23, 1955 |